United States Patent
Zhang et al.

(10) Patent No.: US 10,455,466 B2
(45) Date of Patent: Oct. 22, 2019

(54) HANDOVER METHOD AND DEVICE IN ULTRA-DENSE NETWORK

(71) Applicant: HUAWEI TECHNOLOGIES CO., LTD., Shenzhen, Guangdong (CN)

(72) Inventors: Lili Zhang, Beijing (CN); Nathan Edward Tenny, San Diego, CA (US); Guorong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/759,903

(22) PCT Filed: Dec. 31, 2015

(86) PCT No.: PCT/CN2015/100319
§ 371 (c)(1),
(2) Date: Mar. 14, 2018

(87) PCT Pub. No.: WO2017/113396
PCT Pub. Date: Jul. 6, 2017

(65) Prior Publication Data
US 2018/0255492 A1 Sep. 6, 2018

(51) Int. Cl.
*H04W 36/08* (2009.01)
*H04W 76/15* (2018.01)
(Continued)

(52) U.S. Cl.
CPC ........... *H04W 36/08* (2013.01); *H04W 24/10* (2013.01); *H04W 36/0011* (2013.01);
(Continued)

(58) Field of Classification Search
CPC .............. H04B 7/2121; H04B 7/2123; H04J 2203/0069; H04Q 2213/394; H04W 72/04;
(Continued)

(56) References Cited

U.S. PATENT DOCUMENTS 6,438,117 B1 * 8/2002 Grilli .............. H04W 36/00837
370/331
8,085,713 B2 * 12/2011 Kang .................... H04W 28/20
370/328
(Continued)

FOREIGN PATENT DOCUMENTS

CN 101296163 A 10/2008
CN 101296486 A 10/2008
(Continued)

OTHER PUBLICATIONS

XP051047287 3GPP TS 36.321 V12.8.0 (Dec. 2015),3rd Generation Partnership Project;Technical Specification Group Radio Access Network;Evolved Universal Terrestrial Radio Access (E-UTRA);Medium Access Control (MAC) protocol specification (Release 12),dated Dec. 2015,total 77 pages.
(Continued)

*Primary Examiner* — Sharad Rampuria
(74) *Attorney, Agent, or Firm* — Fish & Richardson P.C.

(57) ABSTRACT

Example handover methods and devices in an ultra-dense network are disclosed. One example method includes the following operations. A source base station sends a first message to a target base station, where the first message carries an arrival time indication of a terminal, and the arrival time indication is used to indicate a time at which or a time range in which the terminal is to access the target base station. The source base station receives a second message fed back by the target base station, where the second message carries a granted resource that is allocated for the arrival time indication of the terminal. The source base station adds the granted resource to a command message, and sends the command message to the terminal.

15 Claims, 5 Drawing Sheets

(51) Int. Cl.
*H04W 76/27* (2018.01)
*H04W 24/10* (2009.01)
*H04W 36/00* (2009.01)
*H04W 56/00* (2009.01)

(52) U.S. Cl.
CPC ......... *H04W 56/001* (2013.01); *H04W 76/15* (2018.02); *H04W 76/27* (2018.02)

(58) Field of Classification Search
CPC ..... H04W 72/12; H04W 76/00; H04W 36/08; H04W 36/0072; H04W 56/001; H04W 76/15; H04W 24/10; H04W 76/27; H04W 36/0011
See application file for complete search history.

(56) References Cited

U.S. PATENT DOCUMENTS

| | | | |
|---|---|---|---|
| 8,380,196 B2* | 2/2013 | Racz | H04W 36/0072 455/436 |
| 9,237,490 B2* | 1/2016 | Pereira | H04W 36/0055 |
| 2012/0033641 A1 | 2/2012 | Huang | |
| 2012/0093128 A1* | 4/2012 | Song | H04W 36/0077 370/331 |
| 2014/0308956 A1 | 10/2014 | Zhang et al. | |

FOREIGN PATENT DOCUMENTS

| | | |
|---|---|---|
| CN | 101919213 A | 12/2010 |
| CN | 103167574 A | 6/2013 |
| CN | 104363621 A | 2/2015 |
| CN | 103210671 B | 2/2016 |
| WO | 2015014831 A1 | 2/2015 |
| WO | 2015154392 A1 | 10/2015 |
| WO | 2017219253 A1 | 12/2017 |

OTHER PUBLICATIONS

XP051065203 3GPP TS 36.331 V12.8.0 (Dec. 2015),3rd Generation Partnership Project;Technical Specification Group Radio Access Network;Evolved Universal Terrestrial Radio Access (E-UTRA);Radio Resource Control (RRC);Protocol specification (Release 12),dated Dec. 2015,total 456 pages.

XP051065267 3GPP TR 36.881 V0.5.0 (Nov. 2015),3rd Generation Partnership Project;Technical Specification Group Radio Access Network;Evolved Universal Terrestrial Radio Access (E-UTRA);Study on latency reduction technipues for LTE(Release 13),dated Nov. 2015,total 86 pages.

Communication Pursuant to Rule 164(1) EPC issued in European Application No. 15912020.3 dated Jun. 8, 2018, 16 pages.

3GPP TS 36.300 V13.1.0 (Sep. 2015),3rd Generation Partnership Project;Technical Specification Group Radio Access Network,Evolved Universal Terrestrial Radio Access (E-UTRA) and Evolved Universal Terrestrial Radio Access Network (E-UTRAN);Overall description;Stage 2(Release 13),dated Sep. 2015,total 254 pages.

R2-063082 Nokia,"Non-contention based handover execution",3GPP TSG-RAN WG2 Meeting #55,Riga, Latvia,Nov. 6-10, 2006,total 3 pages.

R2-072655 Alcatel-Lucent,"RACH-less Handover in synchronized networks",3GPP TSG-RAN WG 2 #58bis LTE, Orlando; Jun. 25-29, 2007,total 3 pages.

Stefania Sesia et al.,"LTE the UMTS Long Term Evolution-From Theory to Practice Second Eddition",A John Wiley and Sons, Ltd.,dated 2011,total 794 pages.

3GPP TS 36.213 V9.1.0 (Mar. 2010),3rd Generation Partnership Project;Technical Specification Group Radio Access Network;Evolved Universal Terrestrial Radio Access (E-UTRA);Physical layer procedures(Release 9),dated Mar. 2010, total 79 pages.

International Search Report issued in International Application No. PCT/CN2015/100319 dated Sep. 19, 2016, 15 pages.

Office Action issued in Chinese Application No. 201580072493.2 dated Jun. 4, 2019, 12 pages (with English translation).

* cited by examiner

HANDOVER METHOD AND DEVICE IN ULTRA-DENSE NETWORK

CROSS-REFERENCE TO RELATED APPLICATIONS

This application is a national stage of International Application No. PCT/CN2015/100319, filed on Dec. 31, 2015, which is hereby incorporated by reference in its entirety.

TECHNICAL FIELD

The present invention relates to the field of communications technologies, and in particular, to a handover method and device in an ultra-dense network.

BACKGROUND

With rapid development of wireless communications technologies, various intelligent terminals present an explosive growing trend, plentiful and diversified data services are also constantly emerging, and high-rate service requirements of users pose a severe challenge to conventional cellular networks. In a heterogeneous cellular network technology, a low-power node, such as a small cell (Small Cell), a femto cell (FemtoCell), or a pico cell (PicoCell), is introduced within a coverage area of a conventional macro cell, so as to pertinently strengthen coverage of a specific area and form multi-layer network coverage. This can effectively achieve QoS assurance for the user and improve system resource usage.

Introduction of small cells changes a network topology structure, and the small cells feature dense deployment and flexible locations. Therefore, an ultra-dense network (Ultra-dense Network, UDN) is formed. There are basically two networking manners for macro base stations and micro base stations in a UDN system: a homogeneous manner, namely, a networking manner supporting deployment that is based on a same frequency channel number; and a heterogeneous manner, namely, a networking manner supporting deployment that is based on different frequency channel numbers. Different networking manners pose a difficulty and challenge to a handover control technology of a UDN network. In a heterogeneous network, a network structure is quite complex. For example, when UE moves within a macro base station, the UE may enter a small cell and leave the small cell many times. UEs at different speeds have different handover performance in moving across different target cells. UE at an excessively high speed may cause a handover failure. In addition, as a radius of a target cell decreases rapidly, UE is handed over to the target cell more frequently, resulting in a greater handover delay. This reduces network performance and affects user experience. Therefore, in the UDN system, because dense cell deployment leads to a new handover problem, how to comprehensively consider a handover delay and user communication experience and design a more effective handover method becomes a problem that urgently needs to be resolved.

SUMMARY

Embodiments of the present invention provide a handover method and device in an ultra-dense network, so as to reduce a cell handover delay.

According to a first aspect, a handover method in an ultra-dense network is provided, including:

sending, by a source base station, a first message to a target base station, where the first message carries an arrival time indication of a terminal, and the arrival time indication is used to indicate a time at which or a time range in which the terminal is to access the target base station;

receiving, by the source base station, a second message fed back by the target base station, where the second message carries a granted resource that is allocated for the arrival time indication of the terminal; and adding, by the source base station, the granted resource to a command message, and sending the command message to the terminal.

In a possible design, the first message is a handover request message, and the second message is a handover request acknowledgement message.

In a possible design, the first message is a secondary base station addition request message, and the second message is a secondary base station addition request acknowledgement message.

In a possible design, the secondary base station addition request message is a dual-link addition request message, and the secondary base station addition request acknowledgement message is a dual-link addition request acknowledgement message; or the secondary base station addition request message is a multi-link addition request message, and the secondary base station addition request acknowledgement message is a multi-link addition request acknowledgement message.

In a possible design, the arrival time indication is obtained by the source base station by performing handover decision, dual-link addition decision, or dual-link addition decision after the source base station receives a measurement report sent by the terminal.

In a possible design, the arrival time indication is obtained by the source base station by means of prediction based on a synchronization delay of the terminal in relation to the target base station and configuration information of the source base station and the target base station.

In a possible design, the adding, by the source base station, the granted resource to a command message, and sending the command message to the terminal includes:

adding, by the source base station, the granted resource to an RRC connection reconfiguration message, and sending the RRC connection reconfiguration message to the terminal.

In a possible design, before the sending, by a source base station, a first message to a target base station, the method further includes:

adding, by the source base station, a resource grant cancellation indication to the first message if the source base station determines that the terminal has at least two target base stations, where the resource grant cancellation indication is used to instruct the target base station not to allocate any granted resource for the arrival time indication.

In a possible design, the granted resource includes an available uplink resource block.

In a possible design, the second message and the command message further carry a maximum quantity of transmission times that is configured for the granted resource by the target base station.

According to a second aspect, a handover method in an ultra-dense network is provided, including:

receiving, by a target base station, a first message sent by a source base station, where the first message carries an arrival time indication of a terminal, and the arrival time indication is used to indicate a time at which or a time range in which the terminal is to access the target base station;

allocating, by the target base station, a granted resource for the arrival time indication of the terminal; and adding, by the target base station, the granted resource to a second message, and feeding back the second message to the source base station.

In a possible design, the target base station configures a maximum quantity of transmission times for the granted resource, adds the maximum quantity of transmission times for the granted resource to the second message, and feeds back the second message to the source base station.

In a possible design, before the allocating, by the target base station, a granted resource for the arrival time indication of the terminal, the method further includes:

determining, by the target base station, that the second message carries no resource grant cancellation indication, where the resource grant cancellation indication is used to instruct the target base station not to allocate any granted resource for the arrival time indication.

In a possible design, the method further includes:

when the target base station determines that the second message carries a resource grant cancellation indication, not allocating, by the target base station, any granted resource for the arrival time indication of the terminal, and feeding back, to the terminal by using the source base station, the second message that carries no granted resource.

According to a third aspect, a handover method in an ultra-dense network is provided, including:

receiving, by a terminal, a command message sent by a source base station, where the command message carries a granted resource that is allocated by a target base station to the terminal; and sending, by the terminal, an RRC connection reconfiguration complete message to the target base station on the granted resource, where the RRC connection reconfiguration complete message is used to indicate to the target base station that the terminal is successfully handed over to, dual-linked to, or multi-linked to the target base station.

In a possible design, before the sending, by the terminal, an RRC connection reconfiguration complete message to the target base station on the granted resource, the method further includes:

performing, by the terminal, a downlink synchronization process with the target base station, and confirming that downlink synchronization with the target base station succeeds.

In a possible design, the RRC connection reconfiguration message further carries a maximum quantity of transmission times that is configured for the granted resource by the target base station.

In a possible design, after the receiving, by a terminal, a command message carrying a granted resource and sent by a source base station, the method further includes:

initiating, by the terminal, a random access process to the target base station before occupying the granted resource.

In a possible design, after the sending, by the terminal, an RRC connection reconfiguration complete message to the target base station on the granted resource, the method further includes:

initiating, by the terminal, a random access process to the target base station when the configured maximum quantity of transmission times for the granted resource is reached and the terminal receives a negative feedback message indicating that signaling transmission on the granted resource fails.

According to a fourth aspect, a base station is provided, and the base station has a function for implementing actual behaviors of the source base station and target base station in the foregoing method. The function may be implemented by hardware, or may be implemented by hardware executing corresponding software. The hardware or software includes one or more modules corresponding to the function.

In a possible design, a structure of the base station includes a processor and a transmitter. The processor is configured to support the base station in performing a corresponding function in the foregoing method. The transmitter is configured to support communication between the base station and UE, and send, to the UE, the information or instruction used in the foregoing method. The base station may further include a memory, and the memory is configured to couple to the processor, and stores a program instruction and data that are necessary for the base station.

According to a fourth aspect, UE is provided, and the UE has a function for implementing UE behaviors in the foregoing method designs. The function may be implemented by hardware, or may be implemented by corresponding hardware-executed software. The hardware or software includes one or more modules corresponding to the function. The module may be software and/or hardware.

In a possible design, a structure of the UE includes a transceiver and a processor. The transceiver is configured to support the UE in receiving the foregoing various instructions sent by the base station to the UE. The processor controls the UE to process information according to the instruction received by the transceiver.

Compared with the prior art, the solutions provided in the present invention can reduce a delay in handing over the terminal to the target cell, improve communication quality of the terminal, and reduce a communication interruption rate.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
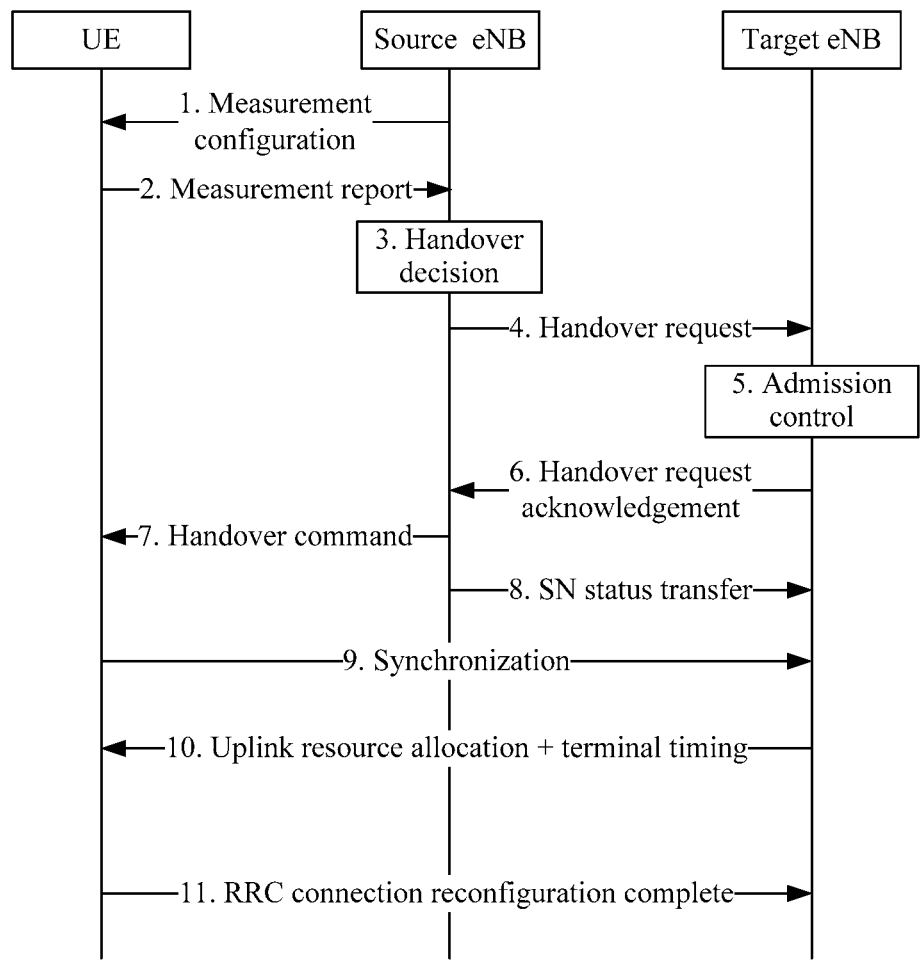
FIG. 1 is a schematic diagram of an existing cell handover process.

FIG. 1 is a schematic diagram of an existing cell handover process. Network entities related to handover include a source evolved NodeB (evolved NodeB, eNB) and a target eNB.

Step 1: The source eNB performs measurement configuration on UE, where a UE measurement result is used to assist the source eNB in performing handover decision.

Step 2: The UE performs measurement reporting according to a measurement configuration of the source eNB.

Step 3: The source eNB performs handover decision by referring to a measurement report of the UE and according to a handover algorithm of the source eNB.

Step 4: The source eNB sends a handover request message to the target eNB, where the handover request message includes information related to handover preparation.

Step 5: The target eNB performs admission control according to the received handover request message, to improve a handover success rate, where reservation of a corresponding resource, a cell radio network temporary identifier (Cell-Radio Network Temporary Tdentifier, C-RNTI), allocation of a dedicated random access preamble (Preamble) code, and the like need to be considered for the admission control.

Step 6: The target eNB performs layer 1/layer 2 (L1/L2) handover preparation, and sends a handover request acknowledgement message to the source eNB.

Step 7: The source eNB transparently transmits, to the UE, a handover command generated by the target eNB, where the handover command carries an RRC connection reconfiguration message of mobility control information.

Step 8: The source eNB sends a sequence number (Sequence number, SN) status transfer message to the target eNB, to transfer an uplink Packet Data Convergence Protocol (Packet Data Convergence Protocol, PDCP) SN reception status and a downlink PDCP SN sending status of an E-UTRAN radio access bearer (E-UTRAN Radio Access Bearer, E-RAB).

Step 9: After receiving the handover command, the UE performs synchronization with a target cell, and accesses the target cell by using a non-contention based random access process if the dedicated random access preamble code is configured in the handover command, or accesses the target cell by using a contention-based random access process if no dedicated random access preamble code is configured.

Step 10: The target eNB replies with an uplink resource allocation indication and terminal timing.

Step 11: After the UE successfully accesses the target cell, the UE sends an RRC connection reconfiguration complete message, to confirm with the target eNB that the handover process is completed.

It can be learned from the foregoing handover process that, in a conventional LTE technology, a handover process to a target cell includes a random access process to the target cell. This increases a handover delay.

Figure 2:
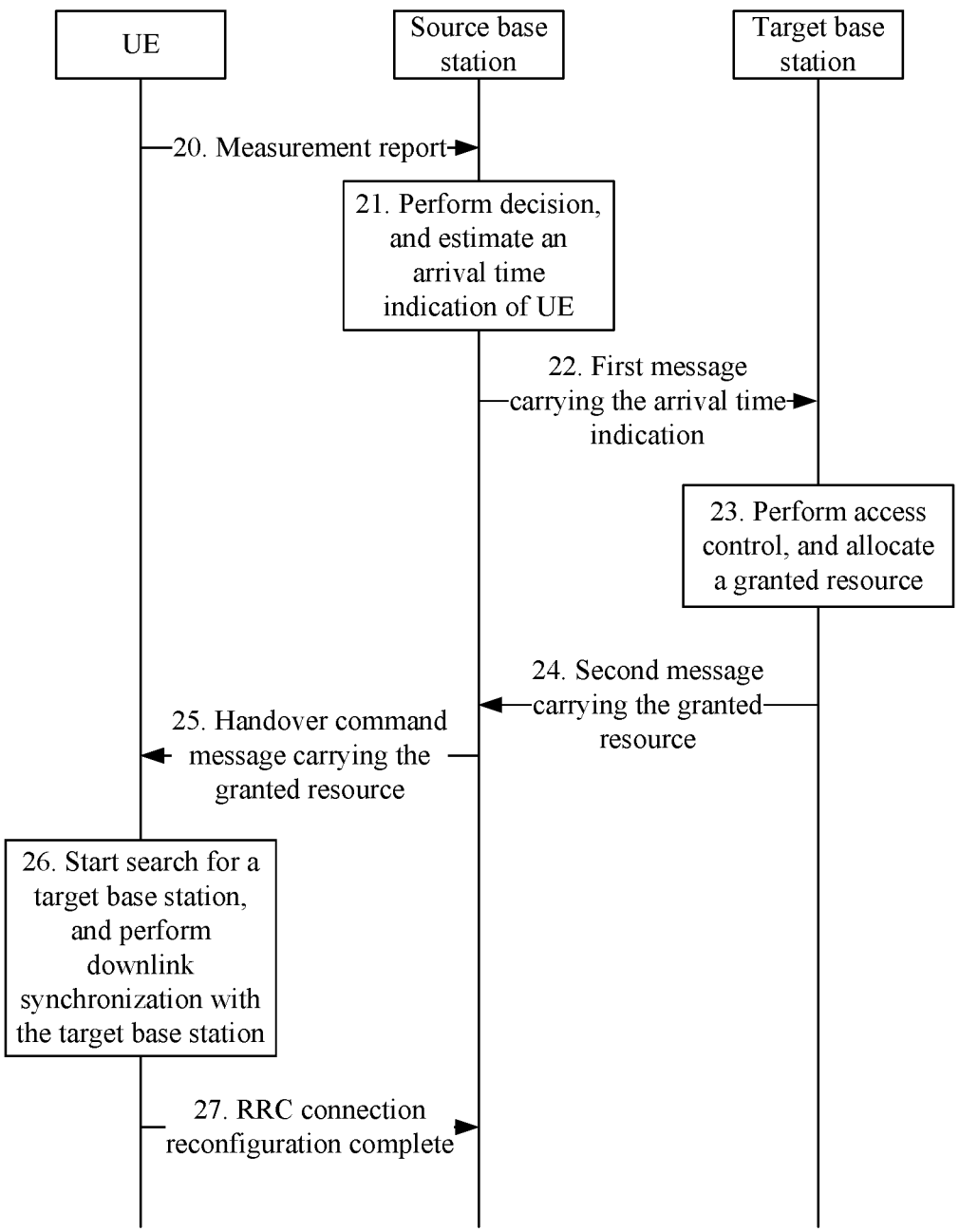
FIG. 2 is a flowchart of a cell handover method according to an embodiment of the present invention.

In a UDN system, when a cell radius is relatively small, frequent cell handover is performed as a result. This increases a handover delay and reduces communication performance. As shown in FIG. 2, an embodiment of the present invention provides a handover method, so as to simplify a handover process and reduce a handover delay. The method specifically includes the following steps.

Step 20: UE performs measurement according to a measurement configuration of a source base station, and reports a measurement report.

Step 21: After receiving the measurement report sent by the UE, the source base station performs handover decision, dual-link addition decision, or dual-link addition decision.

In step 21, the source base station obtains, by means of prediction based on a synchronization delay of the UE in relation to the target base station and configuration information of the source base station and the target base station, an arrival time indication of the UE for arriving at a target base station. The arrival time indication is used to indicate a time at which or a time range in which the terminal is to access the target base station.

Step 22: The source base station sends a first message to the target base station, where the first message carries the arrival time indication of the terminal.

Optionally, the first message is a handover request message; alternatively, the first message is a secondary base station addition request message, and the second message is a secondary base station addition request acknowledgement message.

Optionally, the secondary base station addition request message is a dual-link addition request message, and the secondary base station addition request acknowledgement message is a dual-link addition request acknowledgement message; alternatively, the secondary base station addition request message is a multi-link addition request message, and the secondary base station addition request acknowledgement message is a multi-link addition request acknowledgement message.

Before the source base station sends the first message to the target base station, the source base station adds a resource grant cancellation indication to the first message if the source base station determines that the terminal has at least two target base stations, where the resource grant cancellation indication is used to instruct the target base station not to allocate any granted resource for the arrival time indication.

Step 23: After receiving the first message that is sent by the source base station and that carries the arrival time indication of the terminal, the target base station performs access control, and allocates a granted resource for the arrival time indication.

Optionally, after the target base station receives the first message, if the target base station determines that the first message carries the arrival time indication and carries no resource grant cancellation indication, the target base station predicts, according to the arrival time indication, a time for the UE to perform downlink synchronization with the target base station, and allocates the granted resource to be used by the UE in the target base station, where the granted resource includes an available uplink resource block. This is different from a conventional handover technology in which a non-contention based random access resource is allocated. Optionally, the target base station further configures a maximum quantity of transmission times for the granted resource. The maximum quantity of transmission times is represented by maxHARQ-Tx, and a value of the maximum quantity of transmission times may be set to 1.

Optionally, after the target base station receives the first message, if the target base station determines that the first message carries the arrival time indication and a resource grant cancellation indication, the target base station does not allocate any granted resource for the arrival time indication of the terminal, and feeds back, to the terminal by using the source base station, a second message that carries no granted resource.

Step 24: The target base station adds the granted resource to a second message, and feeds back the second message to the source base station.

Optionally, the first message is a handover request message; alternatively, the first message is a secondary base station addition request message, and the second message is a secondary base station addition request acknowledgement message.

Optionally, the secondary base station addition request message is a dual-link addition request message, and the secondary base station addition request acknowledgement message is a dual-link addition request acknowledgement message; alternatively, the secondary base station addition request message is a multi-link addition request message, and the secondary base station addition request acknowledgement message is a multi-link addition request acknowledgement message.

Optionally, the second message further carries a maximum quantity of transmission times that is configured for the granted resource by the target base station.

Step 25: The source base station adds the granted resource to a command message, and sends the command message to the terminal.

Optionally, the source base station adds the granted resource to an RRC connection reconfiguration message, and sends the RRC connection reconfiguration message to the terminal.

Optionally, the command message further carries a maximum quantity of transmission times that is configured for the granted resource by the target base station.

Step 26: After receiving the command message that carries the granted resource allocated by the target base station to the UE and that is sent by the source base station, the UE starts search for the target base station, and performs downlink synchronization with the target base station.

Optionally, if the UE completes downlink synchronization with the target base station, the UE assumes that the UE is uplink-synchronized with a target cell.

Step 27: The UE sends an RRC connection reconfiguration complete message to the target base station on the granted resource, and continues a subsequent step of a handover process, where the RRC connection reconfiguration complete message is used to indicate to the target base station that the terminal is successfully handed over to, dual-linked to, or multi-linked to the target base station.

Specifically, the UE quickly initiates, according to the granted resource carried in the command message, uplink transmission to the target base station on a specified resource block, and sends the RRC connection reconfiguration complete (RRC Connection Reconfiguration Complete) message to the target base station. In addition, a maximum quantity of transmission times for the uplink transmission is set to 1 according to the configured maximum quantity of transmission times for the granted resource in the command message.

Optionally, after the UE receives the command message carrying the granted resource and sent by the source base station, the UE initiates a random access process to the target base station before occupying the granted resource.

Optionally, after the UE sends the RRC connection reconfiguration complete message to the target base station on the granted resource, the UE initiates a random access process to the target base station when the configured maximum quantity of transmission times for the granted resource is reached and when the UE receives a negative feedback message indicating that signaling transmission on the granted resource fails.

Figure 3:
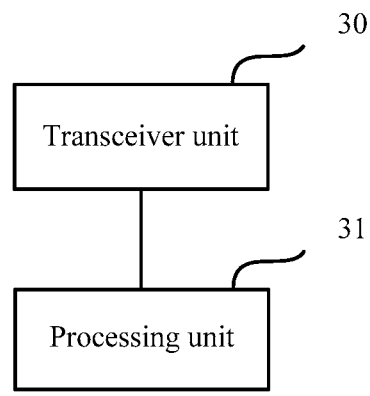
FIG. 3 is a schematic diagram of a network-side communications apparatus according to an embodiment of the present invention.

As shown in FIG. 3, FIG. 3 is a schematic structural diagram of a network-side communications apparatus according to an embodiment of the present invention. The apparatus may be configured to execute the method that is shown in FIG. 2 and that is related to a processing process of a source base station. The communications apparatus may be a base station, or an apparatus installed on a base station, or may be another apparatus that can communicate with a base station.

Referring to FIG. 3, the apparatus includes:

a transceiver unit 30, configured to send a first message to a target base station, where the first message carries an arrival time indication of a terminal, and the arrival time indication is used to indicate a time at which or a time range in which the terminal is to access the target base station, where the transceiver unit 30 is further configured to receive a second message fed back by the target base station, where the second message carries a granted resource that is allocated for the arrival time indication of the terminal; and a processing unit 31, configured to add the granted resource to a command message, and send the command message to the terminal by using the transceiver unit 30.

Optionally, the first message is a handover request message, and the second message is a handover request acknowledgement message.

Optionally, the first message is a handover request message; alternatively, the first message is a secondary base station addition request message, and the second message is a secondary base station addition request acknowledgement message.

Optionally, the secondary base station addition request message is a dual-link addition request message, and the secondary base station addition request acknowledgement message is a dual-link addition request acknowledgement message; alternatively, the secondary base station addition request message is a multi-link addition request message, and the secondary base station addition request acknowledgement message is a multi-link addition request acknowledgement message.

Optionally, the arrival time indication is obtained by the processing unit 31 by performing handover decision, dual-link addition decision, or dual-link addition decision after the transceiver unit 30 receives a measurement report sent by the terminal.

Optionally, the arrival time indication is obtained by the processing unit 31 by means of prediction based on a synchronization delay of the terminal in relation to the target base station and configuration information of the device and the target base station.

Optionally, when adding the granted resource to the command message, the processing unit 31 is specifically configured to:

add, by the processing unit 31, the granted resource to an RRC connection reconfiguration message.

Optionally, before the transceiver unit 30 sends the first message to the target base station, the processing unit 31 is further configured to:

add a resource grant cancellation indication to the first message if it is determined that the terminal has at least two target base stations, where the resource grant cancellation indication is used to instruct the target base station not to allocate any granted resource for the arrival time indication.

Optionally, the granted resource includes an available uplink resource block.

Optionally, the second message and the command message further carry a maximum quantity of transmission times that is configured for the granted resource by the target base station.

Figure 4:
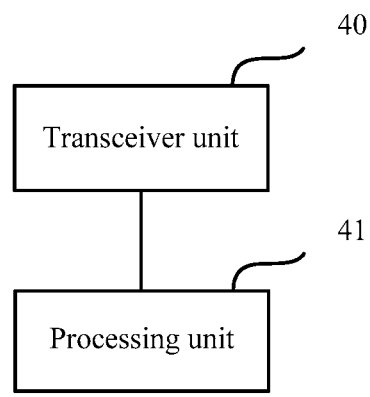
FIG. 4 is a schematic diagram of another network-side communications apparatus according to an embodiment of the present invention.

As shown in FIG. 4, FIG. 4 is a schematic structural diagram of a network-side communications apparatus according to an embodiment of the present invention. The apparatus may be configured to execute the method that is shown in FIG. 2 and that is related to a processing process of a target base station. The communications apparatus may be a base station, or an apparatus installed on a base station, or may be another apparatus that can communicate with a base station.

Referring to FIG. 4, the apparatus includes:

a transceiver unit 40, configured to receive a first message sent by a source base station, where the first message carries an arrival time indication of a terminal, and the arrival time indication is used to indicate a time at which or a time range in which the terminal is to access the device; and a processing unit 41, configured to allocate a granted resource for the arrival time indication of the terminal, where the transceiver unit 40 is further configured to add the granted resource to a second message, and feed back the second message to the source base station.

Optionally, the processing unit 41 is further configured to:

configure a maximum quantity of transmission times for the granted resource, add the maximum quantity of transmission times for the granted resource to the second message, and feed back the second message to the source base station.

Optionally, before allocating the granted resource for the arrival time indication of the terminal, the processing unit 41 is further configured to:

determine that the second message carries no resource grant cancellation indication, where the resource grant cancellation indication is used to instruct the device not to allocate any granted resource for the arrival time indication.

Optionally, the processing unit 41 is further configured to:

when it is determined that the second message carries a resource grant cancellation indication, not allocate any granted resource for the arrival time indication of the terminal, and feed back, to the terminal by using the source base station, the second message that carries no granted resource.

Figure 5:
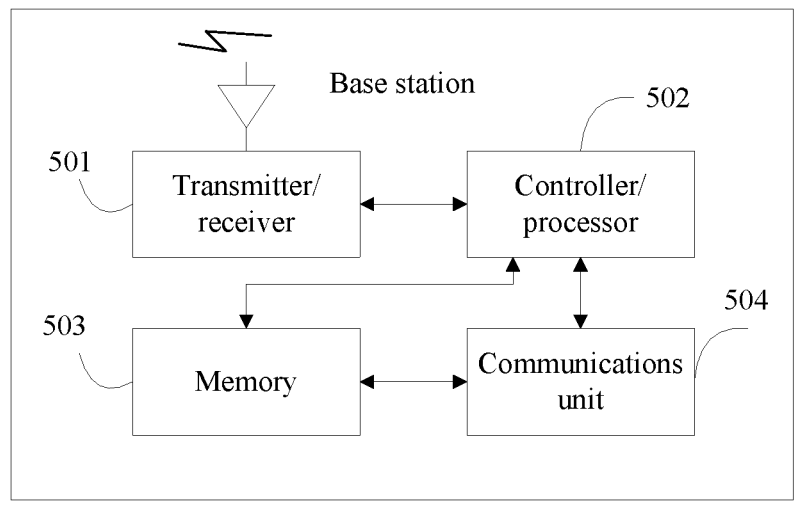
FIG. 5 is a schematic structural diagram of a base station according to an embodiment of the present invention.

FIG. 5 is a possible schematic structural diagram of a base station in the foregoing embodiments.

The base station includes a transmitter/receiver 501, a controller/processor 502, a memory 503, and a communications unit 504. The transmitter/receiver 501 is configured to: support the base station in transmitting/receiving information to/from UE in the foregoing embodiments; and support the UE in performing radio communication with another UE. The controller/processor 502 executes various functions used for communication with the UE. On an uplink, an uplink signal from the UE is received by using an antenna, demodulated by the receiver 501, and further processed by the controller/processor 502 to restore service data and signaling information that are sent by the UE. On a downlink, the controller/processor 502 processes the service data and a signaling message, and the transmitter 501 demodulates processed service data and a processed signaling message to generate a downlink signal. The downlink signal is transmitted to the UE by using an antenna. The controller/processor 502 also executes a processing process related to the source base station and target base station in FIG. 2 and/or another process used for the technology described in this application. The memory 503 is configured to store program code and data of the base station. The communications unit 504 is configured to support the base station in communicating with another network entity. For example, the communications unit 504 is configured to support the base station in communicating with an MME, an SGW, and/or a PGW located in a core network EPC, or the like.

It can be understood that FIG. 5 shows only a simplified design of the base station. In actual application, the base station may include any quantities of transmitters, receivers, processors, controllers, memories, communications units, and the like. All base stations that can implement the present invention fall within the protection scope of the present invention.

Figure 6:
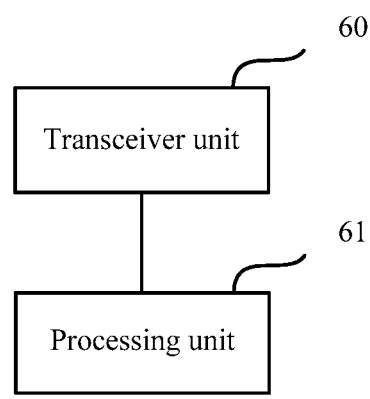
FIG. 6 is a schematic diagram of a user apparatus according to an embodiment of the present invention.

Based on a same idea, as shown in FIG. 6, FIG. 6 is a schematic structural diagram of a user apparatus according to an embodiment of the present invention. The user apparatus may be configured to execute the method that is shown in FIG. 2 and that is related to a processing process of a terminal. The user apparatus may be a wireless terminal. The wireless terminal may be a device that provides voice and/or data connectivity for a user, a handheld device with a wireless connection function, or another processing device connected to a wireless modem. The wireless terminal may communicate with one or more core networks through a radio access network (for example, RAN, Radio Access Network). The wireless terminal may be a mobile terminal, such as a mobile phone (also referred to as a "cellular" phone) or a computer with a mobile terminal. For example, the wireless terminal may be a portable mobile apparatus, a pocket-sized mobile apparatus, a handheld mobile apparatus, a computer built-in mobile apparatus, or an in-vehicle mobile apparatus, where the mobile apparatus exchanges voice and/or data with the radio access network. For example, the wireless terminal may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

Referring to FIG. 6, the apparatus includes:

a processing unit 61, configured to process a message sent or received by a transceiver unit 60; and the transceiver unit 60, configured to: receive a command message sent by a source base station, where the command message carries a granted resource that is allocated by a target base station to the terminal; and send an RRC connection reconfiguration complete message to the target base station on the granted resource, where the RRC connection reconfiguration complete message is used to indicate to the target base station that the terminal is successfully handed over to, dual-linked to, or multi-linked to the target base station.

Optionally, the processing unit 61 is further configured to:

before the transceiver unit 60 sends the RRC connection reconfiguration complete message to the target base station on the granted resource, perform a downlink synchronization process with the target base station, and confirm that downlink synchronization with the target base station succeeds.

Optionally, the processing unit 61 is further configured to:

after the transceiver unit 60 receives the command message carrying the granted resource and sent by the source base station, initiate a random access process to the target base station when determining that the granted resource is not occupied.

Optionally, the RRC connection reconfiguration message further carries a maximum quantity of transmission times that is configured for the granted resource by the target base station, and the processing unit 61 is further configured to:

after the transceiver unit 60 sends the RRC connection reconfiguration complete message to the target base station on the granted resource, initiate a random access process to the target base station when the processing unit 61 determines that the configured maximum quantity of transmission times for the granted resource is reached and the transceiver unit 60 receives a negative feedback message indicating that signaling transmission on the granted resource fails.

Figure 7:
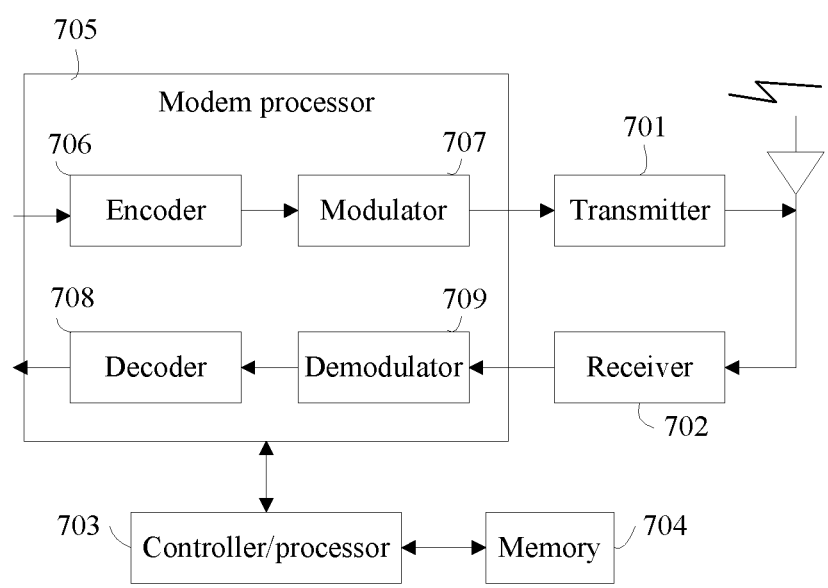
FIG. 7 is a schematic structural diagram of user equipment according to an embodiment of the present invention.

FIG. 7 is a simplified schematic diagram of a possible design structure of UE in the foregoing embodiments. The UE includes a transmitter 701, a receiver 702, a controller/processor 703, a memory 704, and a modem processor 705.

The transmitter 701 performs adjustment (for example, analog conversion, filtering, amplification, or up-conversion) on an output sample and generates an uplink signal. The uplink signal is transmitted, by using an antenna, to a base station described in the foregoing embodiments. On a downlink, an antenna receives a downlink signal transmitted by the base station in the foregoing embodiments. The receiver 702 performs adjustment (for example, filtering, amplification, down-conversion, or digitization) on a signal received from the antenna and provides an input sample. In the modem processor 705, an encoder 706 receives service data and a signaling message that are to be sent on an uplink, and processes (for example, formats, encodes, or interleaves) the service data and the signaling message. A modulator 707 performs further processing (for example, symbol mapping or modulation) on encoded service data and an encoded signaling message, and provides an output sample. A demodulator 709 processes (for example, demodulates) the output sample and provides a symbol estimate. A decoder 708 processes (for example, de-interleaves or decodes) the symbol estimate and provides decoded data and signaling message that are to be sent to the UE. The encoder 706, the modulator 707, the demodulator 709, and the decoder 708 may be implemented by the integrated modem processor 705. These units perform processing according to a radio access technology (for example, an access technology of an LTE system and another evolved system) used by a radio access network.

The controller/processor 703 controls and manages an action of the UE, and is configured to execute processing performed by the UE in the foregoing embodiments. For example, the controller/processor 703 is configured to support the UE in executing the processes 26 and 27 in FIG. 2. The memory 704 is configured to store program code and data that are used for the UE.

A controller/processor configured to perform functions of the base station and the UE in the present invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof, and can implement or execute various logical blocks, modules, and circuits that are described as examples with reference to content disclosed in the present invention. Alternatively, the processor may be a combination implementing a computing function, for example, a combination that includes one or more microprocessors or a combination of a DSP and a microprocessor.

To sum up, in the embodiments of the present invention, the source base station sends the first message to the target base station, where the first message carries the arrival time indication of the terminal, and the arrival time indication is used to indicate the time at which or the time range in which the terminal is to access the target base station. The source base station receives the second message fed back by the target base station, where the second message carries the granted resource that is allocated for the arrival time indication of the terminal. The source base station adds the granted resource to the command message, and sends the command message to the terminal. The terminal receives the command message sent by the source base station, and sends the RRC connection reconfiguration complete message to the target base station on the granted resource, to indicate to the target base station that the terminal is successfully handed over to, dual-linked to, or multi-linked to the target base station. Such a handover process simplifies an existing handover process, omits an existing random access process of a terminal to a target base station, reduces a handover delay, and improves communication quality.

A person of ordinary skill in the art may understand that all or some of the steps of the methods in the foregoing embodiments may be completed by a program instructing a processor. The program may be stored in a computer readable storage medium. The storage medium is a non-transitory (English: non-transitory) medium, for example, a random access memory, a read-only memory, a flash memory, a hard disk, a solid state disk, magnetic tape (English: magnetic tape), a floppy disk (English: floppy disk), an optical disc (English: optical disc), or any combination thereof.

The present invention is described with reference to the flowcharts and block diagrams of the methods and devices in the embodiments of the present invention. It should be understood that computer program instructions may be used to implement each process and each block in the flowcharts and the block diagrams, and a combination of a process and a block in the flowcharts and the block diagrams. These computer program instructions may be provided for a general-purpose computer, a special-purpose computer, an embedded processor, or a processor of another programmable data processing device to generate a machine, so that the instructions executed by the computer or the processor of another programmable data processing device generate an apparatus configured to implement a specified function in one or more processes in the flowcharts and in one or more blocks in the block diagrams.

The foregoing descriptions are merely examples of specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A handover method, comprising:
    receiving, by a terminal, a command message sent by a source base station, wherein the command message carries a granted resource that is allocated by a target base station to the terminal, wherein the command message further carries a maximum quantity of transmission times that is configured for the granted resource by the target base station, and wherein a value of the maximum quantity of transmission times is set to 1;
    sending, by the terminal, a radio resource control (RRC) connection reconfiguration complete message to the target base station on the granted resource, wherein the RRC connection reconfiguration complete message is used to indicate to the target base station that the terminal is successfully handed over to, dual-linked to, or multi-linked to the target base station; and after sending, by the terminal, the RRC connection reconfiguration complete message to the target base station on the granted resource, initiating, by the terminal, a random access process to the target base station when the configured maximum quantity of transmission times for the granted resource is reached and the terminal receives a negative feedback message indicating that signaling transmission on the granted resource fails.

2. The method according to claim 1, further comprising:
before the sending, by the terminal, an RRC connection reconfiguration complete message to the target base station on the granted resource:
  performing, by the terminal, a synchronization process with the target base station; and
  confirming, by the terminal, that synchronization with the target base station succeeds.

3. The method according to claim 1, further comprising:
after the receiving, by a terminal, a command message sent by a source base station, initiating, by the terminal, a random access process to the target base station before occupying the granted resource.

4. A handover device, comprising:
a transceiver, the transceiver configured to:
  send a first message to a target base station, wherein the first message carries an arrival time indication of a terminal, and wherein the arrival time indication is used to indicate a time at which or a time range in which the terminal is to access the target base station; and
  receive a second message fed back by the target base station, wherein the second message carries a granted resource that is allocated for the arrival time indication of the terminal; and
at least one processor, the at least one processor configured to:
  add the granted resource to a command message; and
  send the command message to the terminal by using the transceiver wherein the second message and the command message further carry a maximum quantity of transmission times that is configured for the granted resource by the target base station, and wherein a value of the maximum quantity of transmission times is set to 1.

5. The device according to claim 4, wherein the first message is a handover request message, and wherein the second message is a handover request acknowledgement message.

6. The device according to claim 4, wherein the first message is a secondary base station addition request message, and wherein the second message is a secondary base station addition request acknowledgement message.

7. The device according to claim 6, wherein at least one of:
the secondary base station addition request message is a dual-link addition request message, and the secondary base station addition request acknowledgement message is a dual-link addition request acknowledgement message; and
the secondary base station addition request message is a multi-link addition request message, and the secondary base station addition request acknowledgement message is a multi-link addition request acknowledgement message.

8. The device according to claim 4, wherein the arrival time indication is obtained by the at least one processor by performing handover decision, dual-link addition decision, or dual-link addition decision after the transceiver receives a measurement report sent by the terminal.

9. The device according to claim 4, wherein the arrival time indication is obtained by the at least one processor by a prediction based on a synchronization delay of the terminal in relation to the target base station and configuration information of the device and the target base station.

10. The device according to claim 4, wherein when adding the granted resource to the command message, the at least one processor is configured to:
  add the granted resource to an RRC connection reconfiguration message.

11. The device according to claim 4, the at least one processor is further configured to, before the transceiver sends the first message to the target base station:
  add a resource grant cancellation indication to the first message in response to determining that the terminal has at least two target base stations, wherein the resource grant cancellation indication is used to instruct the target base station not to allocate any granted resource for the arrival time indication.

12. The device according to claim 4, wherein the granted resource comprises an available uplink resource block.

13. User equipment comprising at least one processor and a transceiver connected to the at least one processor, wherein
the at least one processor is configured to process a message received or transmitted by the transceiver; and
the transceiver is configured to:
  receive a command message sent by a source base station, wherein the command message carries a granted resource that is allocated by a target base station to the user equipment, wherein the command message further carries a maximum quantity of transmission times that is configured for the granted resource by the target base station, and wherein a value of the maximum quantity of transmission times is set to 1;
  send a radio resource control (RRC) connection reconfiguration complete message to the target base station on the granted resource, wherein the RRC connection reconfiguration complete message is used to indicate to the target base station that the user equipment is successfully handed over to, dual-linked to, or multi-linked to the target base station; and
  after sending the RRC connection reconfiguration complete message to the target base station on the granted resource, initiate a random access process to the target base station when the configured maximum quantity of transmission times for the granted resource is reached and the user equipment receives a negative feedback message indicating that signaling transmission on the granted resource fails.

14. The user equipment according to claim 13, wherein the at least one processor is further configured to:
  before the transceiver sends the RRC connection reconfiguration complete message to the target base station on the granted resource:
    perform a synchronization process with the target base station; and confirm that synchronization with the target base station succeeds.

15. The user equipment according to claim 14, wherein the at least one processor is further configured to:
after the transceiver receives the command message carrying the granted resource and sent by the source base station, initiate a random access process to the target base station before the granted resource is occupied.

* * * * *